United States Patent [19]

Hoppmann et al.

[11] Patent Number: 5,015,841

[45] Date of Patent: May 14, 1991

[54] OBJECT COMPARING DEVICE WITH DISCRETE SENSORS AND MASTER OBJECT

[75] Inventors: Kurt H. Hoppmann; Horst A. Schober, both of Falls Church, Va.

[73] Assignee: Hoppmann Corporation, Chantilly, Va.

[21] Appl. No.: 403,886

[22] Filed: Sep. 7, 1989

[51] Int. Cl.[5] .................... G01N 9/04

[52] U.S. Cl. .................... 250/223 R; 356/394

[58] Field of Search .................... 250/223 R, 223 B, 561; 356/394, 388, 376; 324/207.14, 207.20

[56] References Cited

U.S. PATENT DOCUMENTS

| | | | |
|---|---|---|---|
| 3,411,625 | 11/1968 | Calhoun | 250/223 R |
| 3,529,169 | 9/1970 | Heaney et al. | 250/223 B |
| 3,546,377 | 12/1970 | Troll | 356/394 |
| 4,241,835 | 12/1980 | Lockett | 250/223 R |
| 4,784,493 | 11/1988 | Turcheck, Jr. et al. | 356/394 |

*Primary Examiner*—David C. Nelms

[57] ABSTRACT

A comparing device for comparing major landmarks and the orientation of a master object to like characteristics of test objects includes a plurality of master sensors arranged in a predetermined pattern corresponding to a desired orientation and/or landmarks of a fixed master object for producing an output representative of the orientation of the fixed master object. A plurality of test sensors are arranged in the same pattern as the plurality of master sensors for sensing major landmarks and the orientation of a test object and for producing an output representative of the orientation and major landmarks of the test object. In addition, a comparison device compares the output of the plurality of master sensors to the output of the plurality of test sensors for providing a signal to indicate incorrectness of the test object corresponding to the desired characteristics of the fixed master object and subsequent ejection of the incorrect test object from the processing line.

10 Claims, 2 Drawing Sheets

OBJECT COMPARING DEVICE WITH DISCRETE SENSORS AND MASTER OBJECT

BACKGROUND OF THE INVENTION

1. Field of the Invention

The present invention is directed to a comparing device for permitting the orientation, completeness and possibly quality of a test object to be quickly and efficiently compared with regard to a desired orientation of a fixed master object. The device automatically compares and subsequently verifies and discriminates various components of given size and shape as well as their orientation.

2. Description of Background Art

Hithertofore, a number or orientation testing devices have been developed. Conventional testing devices may require very sophisticated equipment for checking on the orientation of a particular object. Individuals who are required to operate the machinery must be familiar with the sophisticated equipment in order to properly operate the equipment to check on the orientation, completeness and/or quality of a particular object. Conventional comparing devices suffer from a number of disadvantages relating mainly to the complicated equipment necessary to be calibrated and utilized in order to verify the orientation of an object.

Within our modern age, industrial automation has reached a stage at which many manufacturing processes are being conducted with a minimum of human labor and/or intervention. Machines have taken over tasks in the field of fabrication, assembly, testing/inspection and other processing operations. In order to permit the machine to effectively perform its assigned tasks, certain prerequisites or conditions must be met. One prerequisite relates to the requirement that correct parts in good condition and proper orientation are fed into an automated machine where these parts are being subjected to processing of one kind or another.

SUMMARY AND OBJECTS OF THE INVENTION

It is an object of the present invention to provide a comparing device which may be quickly utilized to check the orientation of a particular object.

Another object of the present invention is to provide a comparing device which may be used with a number of various objects to determine the orientation, completeness and possibly quality of a test object as compared to a master object.

A further object of the present invention is to provide a relatively simple comparing device which may be used by any individual very easily without concern with sophisticated calibration equipment.

Still further object of the present invention is to provide a comparing device which will provide a visual and/or audio indication of the correctness and proper orientation of a test object as compared to a master object.

The above objectives of the invention relate to ascertaining the correctness of components, as well as their shape, condition, and orientation before they are fed into an automated machinery for processing. The described invention then permits the comparison of components to be processed with the shape, condition, size and orientation with those of a perfect condition part that may be selected as a master.

For comparison purposes, one or more distinctive landmarks in the master are selected and subsequently electronically compared with similar landmarks on the test pieces. This means that the electronic signals received from a multitude of sensors focused on the master are compared with the electronic signals received from a multitude of like sensors focused onto the articles to be tested. If identity of all signals can be established, the part under testing is considered to be good. If an imbalance exists in any of the test signals when compared to the master signals, such condition represents some type of deficiency in the test piece and the latter may be easily rejected and/or otherwise identified.

These and other objects of the present invention are achieved by providing a comparing device for comparing the orientation of a master object to the orientation of a test object. The device includes a plurality of master sensors arranged in a predetermined pattern corresponding to a desired orientation and/or significant features of a fixed master object for producing an output representative of these landmarks of the fixed master object. A plurality of test sensors are arranged in the same pattern as the plurality of master sensors for sensing the landmarks of a test object and for producing an output representative of the correctness of the test object. A comparing device is provided for comparing the output of the plurality of master sensors to the output of the plurality of test sensors for providing a signal to indicate a correctness and proper orientation of the test object corresponding to the desired orientation of the fixed master object.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figures 1, 2:
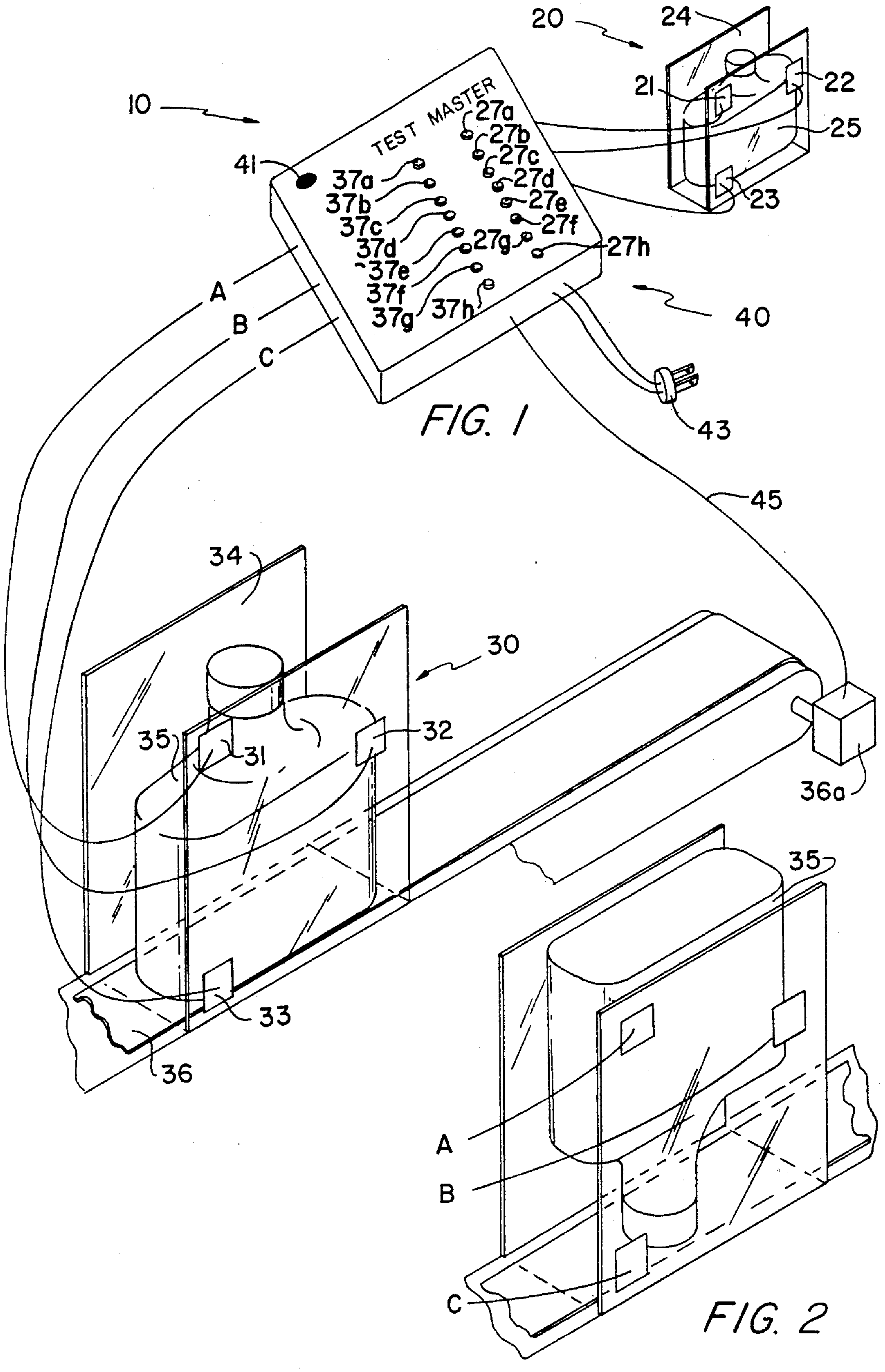
FIG. 1 is a schematic view of a comparing device including a master object orientation station and a test object orientation station according to the present invention.
FIG. 2 is a partial view of a test orientation station showing an object in an incorrect orientation.

FIG. 1 illustrates a schematic view of a comparing device 10 according to the present invention. The comparing device 10 includes a master orientation station 20 and a test orientation station 30. The master orientation station 20 includes a plurality of master sensors 21, 22, and 23 which are arranged in a predetermined pattern corresponding to a desired orientation of a fixed master object 25. The embodiment illustrated in FIG. 1 only discloses three master sensors 21–23. However, a number of additional master sensors may be provided in a predetermined pattern according to pixels, any of the thousands of tiny units or dots that make up an image of an object, which divide the master orientation station into eight or more distinct areas. The pixels would correspond to specific positions on the master orientation station for deciphering the desired orientation of a fixed master object disposed within the master orientation station 20.

As illustrated in FIG. 1, the master orientation station 20 may be constructed as a compartment 24 for containing a fixed master object 25. An individual would position the fixed master object 25 into the compartment 24 in a predetermined orientation which corresponds to the desired orientation of a test object which will be subsequently filled or further processed on an assembly line. In other words, an individual can very easily manually insert the master object into the master orientation station 20 in a predetermined disposition which is a desired orientation for an object to be tested.

The test orientation station 30 includes a compartment 34 which is disposed adjacent to an assembly line 36. The test orientation station 30 includes a plurality of test sensors 31, 32 and 33. As set forth hereinabove, a plurality of test sensors may be disposed on the housing 34 to sense the orientation of a test object 35. Again, the test orientation station 30 can be divided into eight or more pixels which would correspond to various distinct areas on the compartment 34 for sensing the orientation of the test object 35. In the embodiment illustrated in FIG. 1, only three test sensors 31-33 are provided. The particular shape of the object 35 only requires three test sensors to be able to sense the orientation of the test object 35 relative to the master object 25.

A comparing means 40 is operatively connected to the plurality of master sensors 21-23 and the plurality of test sensors 31-33. The comparing means will provide a comparison of the output produced by the master sensors 21-23 as compared to the output produced by the test sensors 31-33. In this manner, an individual operating the comparing device 10 will be able to determine if the test object 35 is in a correct orientation corresponding to the desired orientation of the fixed master object 25.

The comparing means 40 may include a plurality of visual displays 37_a_-37_h_ and 27_a_-27_h_ for providing a visual display of the output generated from the plurality of test sensors and the plurality of master sensors. As illustrated in FIG. 1, eight visual displays are provided for displaying the output from the plurality of test sensors and the plurality of master sensors. The eight visual displays would correspond to the eight pixels of the test orientation station and the master orientation station. Each of the displays may include a light or other visual indication to display whether or not a particular test or master sensor is sensing the presence of an object. An individual operating the comparing device would be able to determine if a test object is in a correct orientation which corresponds to the desired orientation of the fixed master object 25 by merely inspecting the visual displays to determine if the visual displays corresponding to the outputs of the test sensors are equivalent to the visual displays corresponding to the outputs of the master sensors. It is to be understood that the comparing means will function equally well with a larger or smaller number of input-capabilities. Each of the inputs is capable of accepting a variety of sensors to be connected to them. These may include optical, inductive, capacitive, ultrasonic, mechanical or ETC type of sensors. Each input is provided with its own sensitivity control which permits selective compensation of signal variances as detected between different sensors. Accordingly, it will also be possible to establish a base-line or balance between signals produced by the master sensors and the sensors of a good test piece.

The analogue signals derived from the sensors are first subjected to signal processing and then compared by a digital magnitude comparator circuit. If an imbalance is being detected between the signals generated by any like type of test and master landmark sensors, such imbalance is visually annunciated by means of the lights 27_a_-27_h_ and 37_a_-37_h_ and audibly annunciated by means of a transducer 41 and a reject signal is being produced. This reject signal may then be used to activate an eject servo-mechanism or to initiate any other desirable function. If all like type landmark sensors produce identical signals, only a good annunciator is being activated and no alarm signals are being generated.

In order to accommodate inspection of parts while in motion, the system is equipped with a compare-now or trigger input. This circuit tells the comparator exactly when to compare the master signals with the test signals. This "compare-now signal" could be generated by an object "leading edge" sensor in the test compartment.

Although the system described herein provides for a multitude of sensor inputs, it does not require that all inputs be used. Sensor receptacles that are not being used appear automatically as balanced to the signal magnitude comparator circuit.

The entire system is self-contained and may include its own low voltage power source/supply. In the alternative, the comparing device 40 may include an electrical plug 43 for supplying power to the device.

FIG. 2 illustrates the positioning of a test object 35 in an incorrect orientation as compared to the desired orientation of the fixed master object 25. The test object 35 would thereafter be ejected from the assembly line so as to not be conveyed to a filling station or subsequent work station.

The comparing device illustrated in FIG. 1 permits an individual to position a fixed master object 25 in any disposition within the master orientation station 20. Thus, if an individual wishes to have a test object 35 disposed in a predetermined orientation with the mouth of the object facing upwardly, the fixed master object 25 would be disposed in this particular orientation within the master orientation station 20. In the alternative, if an individual wishes to convey a test object 35 in a position wherein the mouth is facing downwardly, then an individual would merely position the fixed master object 25 in this disposition within the master orientation station 20 so as to correspond to a predetermined desired orientation for the test object 35.

The particular object illustrated in FIGS. 1 and 2 only requires two, or possibly three, test sensors and master sensors to determine the correct disposition of the object. Other objects may require more than three test and master sensors. As indicated hereinabove, eight or more test and master sensors may be provided to correctly position an object being conveyed along the conveyor belt 36. No stoppage of the conveyor belt is required for the sensing and signal comparison operations.

In another embodiment of the present invention, a timing actuator within the comparing device 40 can be connected by a connector 45 to a motor 36a controlling the drive mechanism for the conveyor belt 36. In this way, a test object 35 arriving at the test orientation station would be stopped for a predetermined time period in order to check the orientation of the test object 35 and permit the comparing device 40 to compare the orientation to the desired orientation of the fixed master object 25.

A major advantage of the present invention is related to the great versatility and simplicity of operation even by nontechnical personnel. These features contrast sharply with those of other more complex type vision systems available in the marketplace.

Components that are subject to comparative test may be objectively analyzed by any person. Characterizing landmarks can be identified and accordingly, a mechanical templet could be produced for master and test piece alike which would permit the proper positioning and mounting of all required sensors. Change over to another component is easy and quick as it does not require any wiring or electrical changes to the described, non-dedicated test instrument. Therefore, this invention could be used in a wide spectrum of industrial applications.

Figure 3:
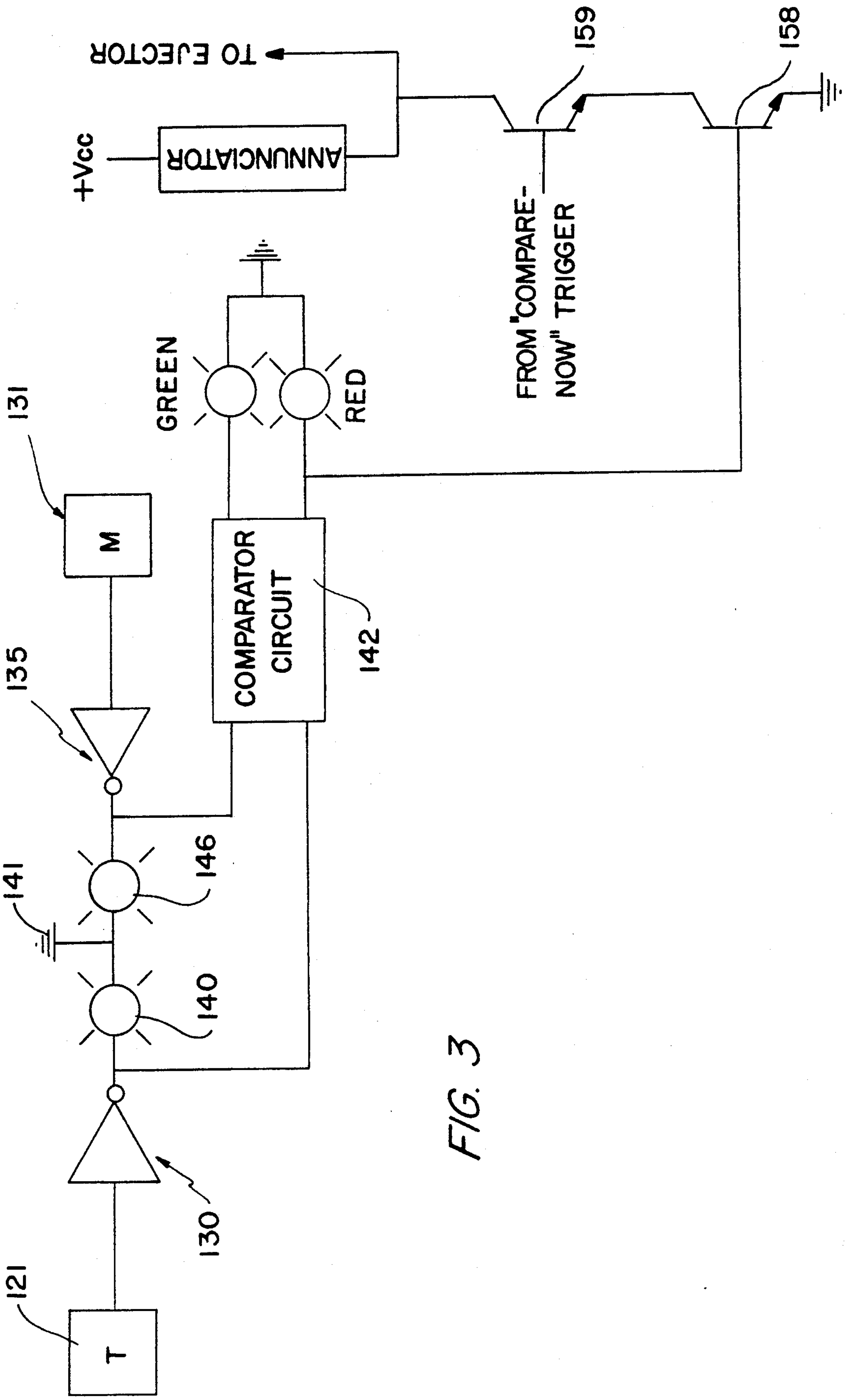
FIG. 3 is a schematic block diagram showing the relationship of components in a single comparing circuit.

FIG. 3 is a schematic block diagram showing the relationship of components for a single circuit in the comparing device 40. More specifically, each sensor 21–23 would include a separate circuit for each of the sensors. These sensors 21–23 could be photocouplers, photoelectric proximity sensors, magnetic sensors, capacitive sensors, ultrasonic sensors, Hall effect sensors or any sensors for sensing which senses a position of an object.

A test sensor 121 identifies a particular test area, such as a pixel, of a test object T. Upon identifying the particular test area, the test sensor produces a test signal. The test signal from the test sensor 121 is transmitted to an inverter 130 for driving a lamp 140. The inverter 130 may also be a driver depending upon the contents of the test signal. The lamp 140 is grounded at 141. In addition, a signal is sent to the comparator circuit 142. Similarly, a master sensor 131 detects a particular test area, such as a pixel, of a master object M. This master sensor also produces a test signal upon identifying the particular test area. This signal is provided to the inverter 135 for driving a lamp 146. In addition, this signal is provided to the comparator circuit 142. The comparator circuit could be one of many conventional circuits for comparing the voltages of the signals from the test sensor 121 and the master sensor 131. For example, a readily available comparator circuit, such as found on a 74LS85 chip, could be used in the present invention. In addition, the inverters 130 and 135 could be conventional NAND circuits, such as found on a 74LS132 chip.

Each of the various sensors for determining the particular pixel of the sensed object is provided with a circuit similar to the circuit illustrated in FIG. 3. The processed signals of test and master sensors are being applied to the multitude of inputs of the magnitude comparator. The latter provides outputs which indicate either an equality between all comparable test and master signals or non-equality, if a discrepancy exists between any of the master and associated test signals.

Non-equality signals from the comparator are applied to an AND-gated transistor circuit which also receives an input from the "compare-now" timing circuit. The collective presents of these two signals results in the generation of a reject annunciation and an eject command. If all of the input signals provided to the comparator indicate that the test object and the master object correspond to the correct orientation, a high output signal is provided which in turn energizes a green lamp 152. If the comparator receives at least one set of signals which indicates that one of the test sensors from the test object does not correspond to the master object, a different output signal is produced and applied to the gate of transistor 158.

A trigger voltage is provided to the transistor 159. The trigger voltage is a signal which indicates that the test object is in an appropriate position so that the comparison between the test object and the master object can begin. If the high output signal and the trigger signal are both supplied to the transistor 158 and 159, respectively, at the same time, an eject signal is generated for actuating an appropriate mechanism to eject the incorrectly oriented test object from the processing line. The eject signal could be a low voltage signal which controls the gate of a switching transistor and, therefore, an eject mechanism.

As previously indicated, the above-described portion of the circuit which relates to comparing the test object to the master object is repeated for a certain number of objects depending upon the quality control precision that is desired. The comparator circuit 142 may be able to compare four or more inputs from test sensors and master sensors. For example, the 74LS85 chip is capable of comparing four test inputs and four master inputs. Numerous other circuits are conceivable for comparing a test signal to a master signal and generating an output signal to indicate whether or not a particular test object is in a correct orientation. The above description is merely a representative description to provide information as to one embodiment of a test circuit capable of use together with the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A comparing device for comparing discrete, individual landmarks of a test object for completeness, quality and orientation as compared to discrete, individual landmarks of a master object comprising:
   - a plurality of discrete, individual master sensors arranged in a predetermined pattern corresponding to certain desired landmarks of a fixed master object for producing an output representative of the orientation of the fixed master object;
   - a plurality of discrete, individual test sensors arranged in the same pattern as said plurality of discrete, individual master sensors for sensing the compatible landmarks of a test object and for producing an output representative of the conditions of the test object; and
   - comparison means for comparing in parallel the output of said plurality of discrete, individual master sensors to the output of said plurality of discrete, individual test sensors for providing a signal to indicate a correctness of said test object corresponding to the desired landmarks of the fixed master object.

2. The comparing device according to claim 1, wherein said plurality of discrete, individual master sensors and said plurality of discrete, individual test sensors are photoelectric proximity sensors for sensing the presence or absence of an object.

3. The comparing device according to claim 1, wherein said plurality of discrete, individual master sensors and said plurality of discrete, individual test sensors each include at least one magnetic sensor for sensing the presence or absence of magnetic material.

4. The comparing device according to claim 1, wherein said comparing means includes a plurality of visual displays, individually connected to each of said plurality of discrete, individual master sensors and discrete, individual test sensors for visually displaying the output from said master sensors and test sensors.

5. The comparing device according to claim 1, wherein said comparing means includes an audio signal for providing an audio indication of the unequal output from said master sensors and test sensors.

6. The comparing device according to claim 1, and further including a timing actuator for synchronizing actuation of said master sensors with said test sensors for providing an appropriate timing for the comparison of master and test signals.

7. The comparing device according to claim 1, and further including an output signal for actuating an ejector to eject test objects that do not generate signal outputs compatible with those of the master sensors.

8. The comparing device according to claim 1, wherein said plurality of discrete, individual master sensors and said plurality of discrete, individual test sensors are capacitive sensors for sensing desired landmarks of an object.

9. The comparing device, according to claim 1, wherein said plurality of discrete, individual master sensors and said plurality of discrete, individual test sensors are ultrasonic sensors for sensing desired landmarks of an object.

10. The comparing device according to claim 1, wherein said plurality of discrete, individual master sensors and said plurality of discrete, individual test sensors are Hall effect sensors for sensing desired landmarks of an object.

* * * * *